United States Patent Office 2,799,690
Patented July 16, 1957

2,799,690
3-KETO-16α,20β-DIHYDROXY PREGNENES

Josef Fried, New Brunswick, and Richard W. Thoma, Somerville, N. J., assignors to Olin Mathieson Chemical Corporation, New York, N. Y., a corporation of Virginia No Drawing. Application April 11, 1956,
Serial No. 577,454

3 Claims. (Cl. 260—397.4)

This application is a continuation-in-part of our parent application Serial No. 349,975, filed April 20, 1953, and now Patent No. 2,756,179, granted July 24, 1956.

This invention relates to the synthesis of new steroids and more particularly to the preparation of the two new streoids $\Delta^4$-pregnene-16α,20β-diol-3-one and $\Delta^{1,4}$-pregnadiene-16α,20β-diol-3-one, which are useful as intermediates in the preparation of 16-ketoprogesterone and 16-keto-1-dehydroprogesterone, respectively, to which they can be oxidized by treatment with chromic acid. 16-ketoprogesterone and 16-keto-1-dehydroprogesterone are physiologically active steroids which are useful as mineralocorticoids since they cause the retention of sodium and chloride ions in animals and man. Hence, the final 16-keto steroids can be used in the treatment of Addison's disease.

The steroids of this invention are prepared as disclosed in said Patent No. 2,756,179, by subjecting 16α-hydroxyprogesterone to the action of the microorganism *Streptomyces lavendulae* in a suitable nutrient medium. The fermentation results in a mixture of $\Delta^4$-pregnene-16α,20β-diol-3-one and $\Delta^{1,4}$-pregnadiene-16α,20β-diol-3-one, which can be separated as disclosed in Example 1 herein. The resultant steroids can then be oxidized by treatment with chromic acid and sulfuric acid in an inert solvent such as acetone or dioxane, as detailed in Examples 2 and 3 herein, to yield 16-ketoprogesterone and 16-keto-1-dehydroprogesterone, respectively.

The following examples illustrates the invention:

EXAMPLE 1

Preparation of $\Delta^4$-pregnene-16α,20β-diol-3-one and $\Delta^{1,4}$-pregnadiene-16α,20β-diol-3-one (a) *Fermentation.*—A medium of the following composition is prepared: soybean meal, 15.0 g.; glucose, 10.0; and distilled water to make 1 liter. The medium is adjusted to pH 7.0±0.1. Then, 100 ml. portions of the medium are distributed in 500 ml. Erlenmeyer flasks, and 1 ml. of chloroform solution of soybean oil and 16α-hydroxyprogesterone per flask is added, to provide 2.2 g. soybean oil and 0.5 g. steroid per liter. The flasks are plugged with cotton and sterilized in the usual manner (i. e., by autoclaving for 30 minutes at 120° C.). When cool, each of the flasks is inoculated with 5–10% of a vegetative inoculum of *Streptomyces lavendulae* [the vegetative inoculum being grown from stock cultures (lyophilized vial or agar slant) for 48–72 hours, with or without transfer and additional incubation for 24–48 hours, in a medium of the following composition: soybean meal, 15.0 g.; glucose, 10 g.; soybean oil, 2.2 g.; and distilled water to make 1 liter]. The flasks are then placed on a reciprocating shaker and mechanically shaken at 25° C. for 3 days. The contents of the flasks are then pooled, and, after the pH of the culture is adjusted to about 4±0.2 with sulfuric acid, filtered (using Seitz filter pads or other suitable filtering media) to separate the mycelium from the fermented medium.

(b) *Isolation of $\Delta^4$-pregnene-16α,20β-diol-3-one.*—The culture filtrate, obtained as described in (a), is taken to dryness by in vacuo distillation to yield about 160 mg. of fat-free steroids. These steroids are dissolved in 10 ml. of a 1:9 chloroform-benzene mixture, then adsorbed on 3.2 g. of sulfuric acid-washed alumina. Elution with 100 ml. 1:3 chloroform-benzene yields about 20 mg. of 16α-hydroxyprogesterone. Subsequent elution with 300 ml. of benzene yields about 54 mg. of $\Delta^4$-pregnene-16α, 20β-diol-3-one having the following properties: M. P. about 212–213° C.; $[\alpha]_D^{23}+44°$ (c., 0.97 in chloroform);

$\lambda_{max}^{alc.}$ 241 mμ ($\epsilon=15,200$); $\lambda_{max}^{Nujol}$ 3.01μ (OH), 6.04μ (conj. CO) and 6.21μ(conj. double bond)

*Anal.*—Calcd. for $C_{21}H_{32}O_3$: C, 75.86; H, 9.70. Found: C, 75.97; H, 9.71.

(c) *Isolation of $\Delta^{1,4}$-pregnadiene-16α,20β-diol-3-one.*—Further elution of the alumina column with 125 ml. of chloroform yields about 24 mg. of $\Delta^{1,4}$-pregnadiene-16α, 20β-diol-3-one, which after two recrystallizations from acetone is found to have the following properties: M. P. about 226.5–227° C.; $[\alpha]_D^{23}-15°$ (c., 0.53 in chloroform);

$\lambda_{max}^{alc.}$ 245 mμ ($\epsilon=15,000$); $\lambda_{max}^{Nujol}$ 3.03μ (OH), 6.04μ (conj. CO), 6.19μ (conj. double bond)

*Anal.*—Calcd. for $C_{21}H_{30}O_3$: C, 76.32; H, 9.70. Found: C, 76.45; H, 9.75.

EXAMPLE 2

Preparation of 16-ketoprogesterone

To a solution of 100 mg. of $\Delta^4$-pregnene-16α,20β-diol-3-one in 10 ml. of acetone is added at room temperature with stirring over a period of 15 minutes 0.25 ml. of a solution of 200 mg. of $CrO_3$ and 320 mg. of concentrated sulfuric acid in 1 ml. of water. A few drops ol alcohol are added, and the reaction mixture is diluted with 5 ml. of water and the acetone removed in vacuo. The resulting aqueous suspension is extracted with chloroform and the chloroform solution washed with dilute sodium bicarbonate solution and water, dried over sodium sulfate and the solvent removed in vacuo. About 95 mg. of crude crystalline 16-keto progesterone is obtained, which after crystallization from acetone-ether (about 80 mg.) has the following properties: needles, M. P. 162–165° C.; $[\alpha]_D^{23}+37°$ (c., 0.77 in chloroform), $+27°$ (c., 0.30 in methanol), $+115°$ (c., 0.30 in 0.0185 N KOH—MeOH);

$\lambda_{max}^{EtOH}$ 239 mμ ($\epsilon=21,500$), 286 mμ($\epsilon=6000$, c., 0.0045%);
$\lambda_{max}^{2.5\% KOH\ in\ MeOH}$ 241 mμ ($\epsilon=18,500$), 308 mμ ($\epsilon=27,000$);
$\lambda_{max}^{CHCl_3}$ 5.74μ, 5.90μ, 6.02μ, 6.22μ

*Anal.*—Calcd. for $C_{21}H_{28}O_3$ (328.44): C, 76.79; H, 8.59. Found: C, 76.76; H, 8.62.

EXAMPLE 3

Preparation of 16-keto-1-dehydroprogesterone

By following the procedure of Example 2, but substituting 100 mg. of $\Delta^{1,4}$-pregnadiene-16α,20β-diol-3-one for the $\Delta^4$-pregnene-16α,20β-diol-3-one, there is obtained 16-keto-1-dehydroprogesterone.

The invention may be variously otherwise embodied within the scope of the appended claims.

We claim:
1. A compound selected from the group consisting of $\Delta^4$-pregnene-16α,20β-diol-3-one and $\Delta^{1,4}$-pregnadiene-16α, 20β-diol-3-one.
2. $\Delta^4$-pregnene-16α,20β-diol-3-one.
3. $\Delta^{1,4}$-pregnadiene-16α,20β-diol-3-one.

References Cited in the file of this patent
UNITED STATES PATENTS 2,265,143   Butenandt _____ Dec. 9, 1941

FOREIGN PATENTS 215,286   Switzerland _____ Sept. 16, 1941